Dec. 27, 1966  J. C. VON DER HEIDE  3,294,971
APPARATUS FOR THE CORONA DISCHARGE TREATMENT OF THERMOPLASTIC
FILMS WHEREIN THE DISCHARGE ELECTRODE HAS
A PLURALITY OF KNIFE EDGES
Filed Feb. 8, 1965  2 Sheets-Sheet 1

INVENTOR
JACK C. VON DER HEIDE
BY Allen A. Meyer, Jr.
ATTORNEY

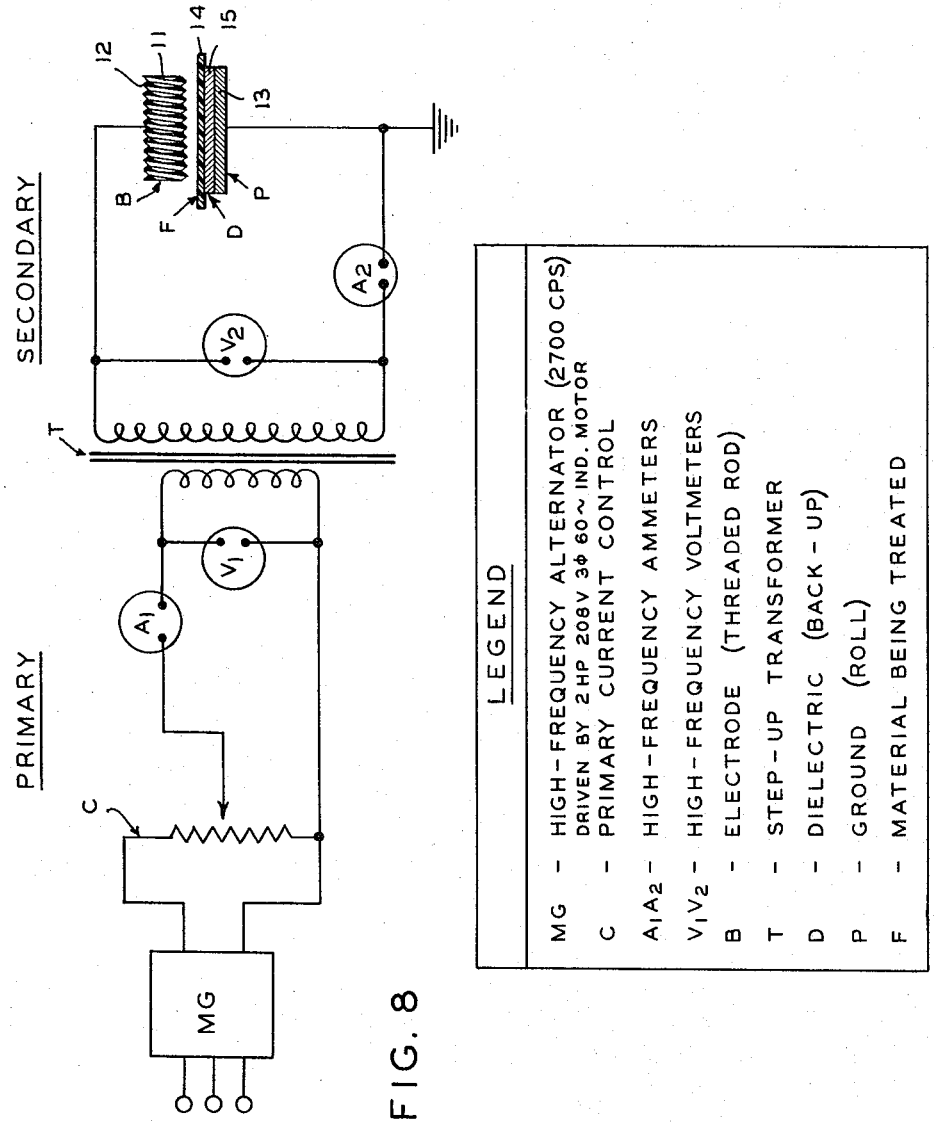

United States Patent Office 3,294,971
Patented Dec. 27, 1966

3,294,971
APPARATUS FOR THE CORONA DISCHARGE TREATMENT OF THERMOPLASTIC FILMS WHEREIN THE DISCHARGE ELECTRODE HAS A PLURALITY OF KNIFE EDGES
Jack C. von der Heide, Shelton, Conn., assignor to National Distillers and Chemical Corporation, New York, N.Y., a corporation of Virginia
Filed Feb. 8, 1965, Ser. No. 431,045
5 Claims. (Cl. 250—49.5)

This invention relates to improvements in method and apparatus for treating plastic materials whereby the surface characteristics thereof are modified to improve the capacity for the adherent reception thereupon of printing inks and to improve adhesion characteristics as between polyolefin extrusion coatings and various substrates.

The present application is a continuation-in-part of copending application Serial No. 82,187 filed January 12, 1961, now abandoned.

It is known that many plastic materials, and polyethylene in sheet and film or other form in particular, present unusual problems in connection with the printing or otherwise impressing of indicia or the like thereupon by reason of inherently non-adherent surface characteristics. It is also known that by corona discharge treatment such surfaces are so modified as to become receptive to printing inks, or the like, and reasonably satisfactory impressions may be received and retained thereupon. Without treatment of this character, such impressions would peel or rub off upon handling. It is to the improvement of such corona discharge treatment that this invention is directed.

Corona discharge treatment of materials of the character with which we presently are concerned, and polyethylene film in particular, requires the production of a controllable corona discharge at the film surface to be treated. In general, a suitable device or apparatus includes an alternating electrical current generator to provide the high voltage to the electrode, an electrode which serves as the implement to which the electric current is supplied and upon which the corona discharge is generated, a grounded back-up member which, conveniently, is a roller and serves to complete the electrical circuit, and a dielectric member which is interposed between the electrode and the back-up member and which functions to spread the corona discharge along the length of the electrode.

The polyethylene film to be treated is advanced longitudinally beneath the electrode (or electrodes) while corona is being discharged therefrom. Further, a buffer dielectric member also may be present to prevent concentration of corona discharge at a pinhole or other defect in the film to obviate burning or otherwise damaging of the film at the area of such defect. This buffer dielectric layer may be positioned adjacent the electrode or back-up member, as desired.

The character of the electrode which is employed is of considerable importance to the uniformity of corona discharge and, hence, to the uniformity of film treatment and, in great part, forms the subject matter of the present invention.

Because of electron density, an electrode having a pinpoint or knife discharge area will initiate a corona discharge more readily and efficiently than will an electrode having a flat surface; however, the pin-point or knife edge must be negative with respect to the back-up member to be effective. Further, with a knife edge electrode, and under present practices this is one of the most satisfactory forms of electrode, vibration or vibratory influences may be set up thus seriously interfering with uniformity of discharge upon the surface being treated.

When the electrode is in the form of a flat surface it will sustain a corona discharge with nearly equal effectiveness, irrespective of whether the discharging surface is positive or negative with respect to the back-up member. This is of great importance when alternating electric current is employed to generate the corona discharge because the potential is positive as frequently as it is negative. Thus, the flat surface electrode will generate equal positive and negative half-cycle corona discharges using an alternating electric current supply. Unfortunately, the corona discharge supplied through use of a flat surface electrode lacks both uniformity and controllability in that a great deal higher potential is required to initiate the discharge than is needed with the knife edge electrode. More particularly, the onset of corona occurs in an avalanche and the corona discharge needles are spaced randomly along the electrode surface. As a result, the polyethylene film or other material under treatment is not treated uniformly across its surface.

In accordance with the present invention, the electrode is constituted by what may be termed a plurality of knife edges so positioned that these edges are generally parallel to the longitudinal axis of the polyethylene or other material being treated, e.g., parallel to the direction of travel of such material or film, and these knife edges are connected together into an electrically continuous structure which extends transversely across the width of the film. Under such circumstances there is combined the capacity of the flat plate to sustain corona upon application of either positive or negative electrical potential with the ease of corona discharge which is characteristic of the knife edge electrode. Complete corona uniformity has been found inherent with the uniform and close spacing of the plurality of knife edges.

This combination of positive and negative discharge efficiency and uniformity and controllability of the corona discharge is especially evident when the plurality of knife edges which generate the corona discharge are combined into a continuous knife edge which repetitively presents portions of itself into corona discharging spatial relationship with respect to the back-up member. Desirably, the corona discharging knife edges may be positioned at a slight angle up to 45°, preferably at an angle from 1-20°, with respect to the direction of travel of the film so as to maximize uniformity of corona discharge across the width of the film being treated.

While various electrode designs or configurations may be utilized, the foregoing electrode structural features are best supplied by a rod-like element of circular, oval or other regular cross-sectional configuration and which is provided with continuous helical knife edge, such a structure being represented or typified by a threaded rod or stud. An electrode of this character provides substantially identical and excellent corona discharge efficiency at both negative and positive potentials and the corona discharge is both uniform and readily controllable.

The alternating current generators, the voltage, the frequency, the electrode spacing and the selection of dielectric layers in accordance with the invention parallel those known to this art in connection with the use of conventional electrodes and thus no particular discussion thereof is believed to be required here.

For purposes of illustration the invention now will be described in connection with the accompanying drawing wherein:

FIGURE 8 is a circuit diagram of the preferred embodiment described in the example.

Figure 1:
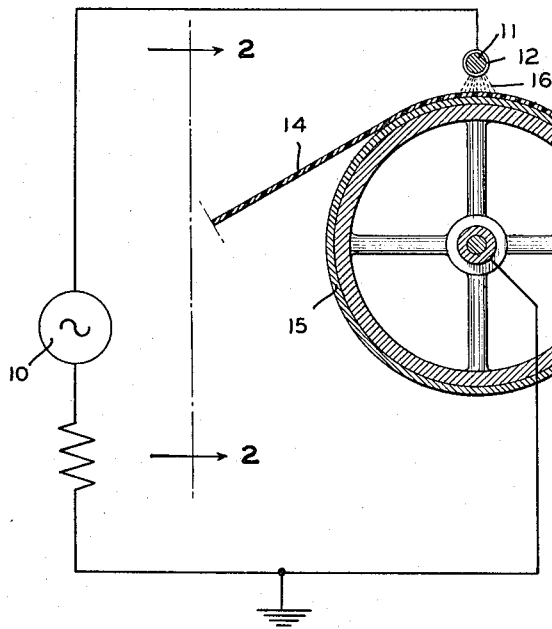
FIGURE 1 is a diagrammatic sectional view illustrating a corona discharge circuit and apparatus in accordance with the present invention.

Referring more particularly to the drawing, FIGURE 1 illustrates the circuit which is used in carrying out the invention. As illustrated, the A.C. generator 10 supplies alternating electrical current (preferably an alternating current having a sine wave configuration) to an electrode 11 having a continuous knife edge 12 which repetitively presents a portion thereof into corona discharging spatial relationship to the grounded back-up roll 13, the knife edge 12 generally paralleling the direction of travel of the material or olefin film (such as polyethylene, polypropylene, etc.) 14 being treated, this direction of travel or movement coinciding with the longitudinal axis of the film and being indicated by the arrow A. A conventional buffer dielectric layer 15 is interposed between the electrode 11 and the back-up roll 13.

Figure 2:
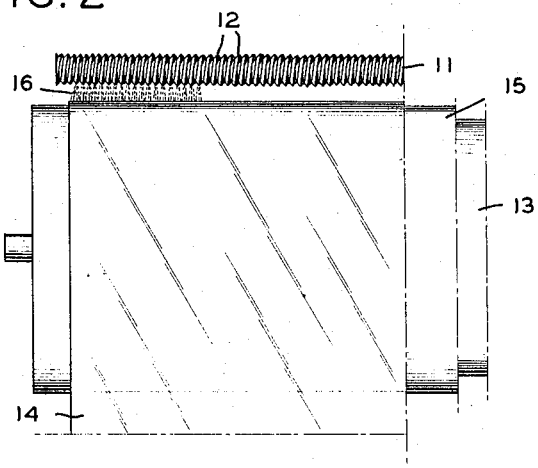
FIGURE 2 is a fragmentary elevational view taken along the line 2—2 of FIGURE 1 looking in the direction of the arrows.

The corona discharge is illustrated diagrammatically at 16 where it will be observed that the discharge 16 is spread to form a band of appreciable width, this corona discharge band extending across the entire width to be treated as the film is advanced longitudinally beneath the electrode. The corona discharge 16, as well as the manner in which the width of the band is spread along the length of the film also is clearly illustrated in FIGURE 2 where the relatively slight angle of successive knife edge portions 12, with respect to the direction of film travel or movement, will be seen to function to provide uniform distribution of corona 16 across the width of the film, by virtue of the uniformity in spacing of the knife edge portions 12.

Figure 3:
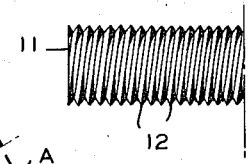
FIGURE 3 is a fragmentary elevational view of the electrode of FIGURES 1 and 2.
Figure 4:
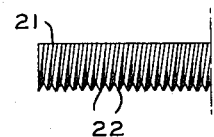
FIGURE 4 is a fragmentary elevational view of a modified form of electrode.
Figure 6:
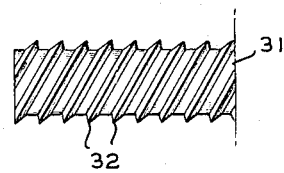
FIGURE 6 is a fragmentary elevational view of a still further modified form of electrode.
Figure 7:
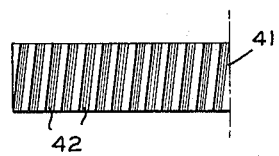
FIGURE 7 is a fragmentary elevational view of a still further modified form of electrode.

The electrode 11 illustrated in FIGURE 3 has a continuous thread, or knife edge 12 and is of circular cross-sectional configuration. The electrode 21 illustrated in FIGURE 4 is of semi-circular cross-sectional configuration and has parallel knife edges 22. The electrode 31 illustrated in FIGURE 6 is of rectangular cross-sectional configuration and has a continuous knife edge 32 formed thereon.

Other forms may be employed with entirely satisfactory results; for example, a serrated element 41 resembling a file or rasp will provide closely spaced and parallel knife edges 42 for effective, uniform and readily controlled corona discharge.

To illustrate a specific suitable threaded rod for use as the electrode 11, there may be utilized a standard $5/16''$—18 N.C. threaded stud of a length required by the width of the film or material to be treated. Such a stud may be cut longitudinally to provide the electrode 21 illustrated in FIGURE 4 of the drawing.

Figure 5:
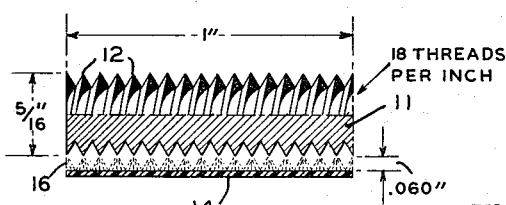
FIGURE 5 is a fragmentary view on a somewhat enlarged scale and illustrating, with dimensions and legend a preferred form of electrode.

Considering this preferred form of electrode 11, illustrated in FIGURE 5 of the drawings, it will be apparent that the distance between the threads, or adjacent knife edges, is of great or critical importance. It will be understood that the corona discharge spreads in the air depending on the gap that the corona must jump from the electrode to the film being treated. There are other factors which enter; however, the gap is of greatest importance and the recommended gap is sixty thousandths of an inch (hereafter stated as 60 mils).

At the normal level of film treatment for printing, the corona will spread about 60° from the apex of the thread or knife edge and, for optimum results, the entire surface of the film or other material being treated must be subjected to the corona for uniform treatment. Assuming normal treatment level, with a 60 mil air gap for the corona and a 60° spread by the corona, the discharge emanating from each thread or knife edge will cover completely a width of 60 mils. Thus, dividing each inch of rod or electrode length by 60, this being the width of the gap, to establish the desirable number of threads or knife edges per inch, it is discovered that 16 or 17 threads per inch is the theoretical minimum number required for superior results.

Commercially available threaded rod (or all-thread as it is generally termed) with N.C. (National Course) threads, with a rod diameter of $5/16''$, has 18 threads per inch and is eminently suitable for present purposes. So, too, with respect to similar rod having a diameter of $3/8''$ which has 16 threads per inch. On larger diameter studs or rods, other thread types also may be purchased commercially that have the required number of threads per inch.

As a general rule, and where for one reason or another the width of the gap may be increased, the distance between threads or knife edges should approximate the width of the gap, it being understood that with increased gap there is the necessity for higher level of treatment.

To insure uniform, and complete, treatment of film surface, it is necessary that there be no untreated areas between the corona discharge from adjacent threads or knife edges. Thus, the knife edges in the electrodes of the present invention are closely spaced and, allowing for the 60° spread of the corona from each knife edge, the distance between adjacent knife edges should not exceed the width of the gap which the corona is required to jump.

While the invention contemplates primarily the use of a single threaded rod or corresponding electrode element falling within the invention, several electrode members may be used and these may have various lengths as required. To illustrate, a single electrode can be loaded only to a certain maximum value, about 5 ma./in., before the discharge becomes so violent that it is no longer uniform. Should higher current densities be required, or desired, two or more electrodes may be placed in parallel or an electrode of greater cross sectional area can be employed. Thus, instead of the $5/16''$—N.C. stud referred to hereabove, a $1/2''$ 12 N.C. can be substituted.

It also will be understood that an increased corona band width may produce an adverse effect, that is, the surface temperature of the polyethylene film or material being treated may become excessive. Accordingly, where multiple electrodes are employed, these should be spaced apart at least 1 inch to allow the polyethylene surface first time to cool before being subjected to a second discharge from the second electrode, etc. To the point of burning the film, a single electrode with a large discharge accomplishes the same treat as do multiple electrodes with correspondingly smaller discharges per electrode.

A further benefit achieved by the present invention arises out of the inherent rigidity of the electrodes; knife edge corona discharge is obtained while adverse vibratory influences have been eliminated.

The invention is illustrated in the specific example which follows:

EXAMPLE

ELECTRODE—5/16″—18 N.C. THREADED ROD—16″ LENGTH

|  | E-Run (Voltage) | Primary Current, am. | E Gap | Bar Current, ma. | Grams Adhesion, gm./in. |
|---|---|---|---|---|---|
| D-1 | 155 | 3.9 | 14,250 | 40 | 600 |
| D-2 | 143 | 3.2 | 12,500 | 30 | 465 |
| D-3 | 120 | 2.1 | 9,900 | 20 | 159 |
| D-4 | Note: Without control or treatment. | | | | |

ELECTRODE—KNIFE EDGE—16″ LENGTH

|  | E-Run (Voltage) | Primary Current, am. | E Gap | Bar Current, ma. | Grams Adhesion, gm./in. |
|---|---|---|---|---|---|
| E-1 | 165 | 3.5 | 15,200 | 40 | 352 |
| E-2 | 152 | 3.15 | 13,800 | 30 | 380 |
| E-3 | 130 | 2.3 | 11,000 | 20 | 345 |
|  | Note: Without control or treatment. | | | | |

THREADED ROD ELECTRODE

| E-Run (Voltage) | | Primary Current | | Input Power | E-Gap (Voltage) | | Bar Current | | Power In Gap |
|---|---|---|---|---|---|---|---|---|---|
| 155 | × | 3.9 | = | 604.5 | 14,250 | × | 0.040 | = | 570.0 |
| 143 | × | 3.2 | = | 457.6 | 12,500 | × | 0.030 | = | 375.0 |
| 120 | × | 2.1 | = | 252.0 | 9,900 | × | 0.020 | = | 198.0 |

KNIFE EDGE ELECTRODE

| 165 | × | 3.5 | = | 610.5 | 15,200 | × | 0.040 | = | 608.0 |
|---|---|---|---|---|---|---|---|---|---|
| 152 | × | 3.15 | = | 578.8 | 13,800 | × | 0.030 | = | 414.0 |
| 130 | × | 2.3 | = | 299.0 | 11,000 | × | 0.020 | = | 220.0 |

In the foregoing example identical film was used with the threaded rod and knife edge electrodes. This was a polyethylene resin film, 1.5 mils thick and 18″ wide, having the following characteristics: 3 melt index; .921 density and with low slip additive. Rate of film movement was identical as was spacing from edge of electrode to film surface.

In the adhesion test, Bauer & Black adhesive tape was employed and the tape was pulled from the film on an Instron Tensile Tester.

Prior teachings have followed the theory that, with corona treatment, adhesion characteristics improved in direct ratio to the power in the gap. Considering the results set forth hereabove, greater power in the gap is required in connection with the knife electrode than with the threaded bar; however, insofar as adhesive characteristics are concerned, increases up to 70% are obtained through utilization of the threaded rod electrode and with (approximately) a 5% reduction of power in the gap.

As this invention may be embodied in several forms without departing from the spirit or essential characteristics thereof, the present embodiment is therefore understood to be merely illustrative and not restrictive and, since the scope of the invention is defined by the appended claims, all changes that fall within the metes and bounds of the claims or that form their functional as well as conjointly cooperative equivalents therefore are intended to be embraced by those claims.

What is claimed is:

1. In apparatus for improving the adhesion characteristics of polyolefin film through corona discharge treatment, including electrode means for generating a corona discharge across a gap and upon the film being treated, means for supplying high frequency alternating electric current to said electrode means, a grounded back-up member and a dielectric layer interposed between said electrode means and said back-up member, the improvement which comprises electrode means constituted by at least one rigid rod-like member extending transversely across the width of the film being treated, said electrode means including a corona discharge surface constituted by a plurality of uniformly and closely spaced parallel knife edges disposed transversely with respect to the longitudinal axis of said rod-like member and extending into corona discharging spatial relationship with respect to said back-up member, the maximum distance between adjacent knife edges being no greater than the gap over which the corona discharge travels, the width of the gap being on the order of 0.060 of an inch and the number of knife edges on said rigid rod-like member being on the order of 16 to 18 edges per inch.

2. Apparatus as set forth in claim 1 in which the knife edges are positioned at an angle up to 45° with respect to the direction of travel of the film.

3. Apparatus as set forth in claim 1 in which said knife edges are positioned at an angle of from 1° to 20° with respect to the direction of travel of the film.

4. Apparatus as set forth in claim 1 in which said plurality of knife edges which generate the corona discharge are combined into a continuous knife edge which repetitively extends portions of itself into corona discharging spatial relationship with respect to said back-up member.

5. In apparatus for the corona discharge treatment of polyolefin film comprising electrode means for generating a corona discharge across a gap and upon the film being treated, means for supplying high frequency alternating electric current to said electrode means, a grounded back-up member and a dielectric layer interposed between said electrode means and said back-up means, the improvement which comprises electrode means constituted by at least one rigid rod-like member extending transversely across the width of the film being treated, said rod-like member being surfaced with a helical continuous knife edge which repetitively extends portions of itself into corona discharging spatial relationship with respect to said back-up member, said portions of said knife edge being parallel to each other and being uniformly and closely spaced and positioned to generally parallel the direction of travel of the film, the maximum distance between adjacent portions of said knife edge being no greater than the gap over which the corona discharge travels, said electrode means being constituted by a threaded stud, the width of the gap being on the order of 0.060 of an inch and the number of threads on said stud being on the order of 16 to 18 threads per inch.

References Cited by the Examiner

UNITED STATES PATENTS

| 1,832,009 | 11/1931 | Foulke | 313—351 |
|---|---|---|---|
| 2,427,086 | 9/1947 | Arnott et al. | 313—309 |
| 2,882,412 | 4/1959 | Cunningham | 250—49.5 |
| 2,939,956 | 6/1960 | Parks | 250—49.5 |
| 2,965,755 | 12/1960 | West | 250—49.5 |
| 2,991,360 | 7/1961 | Schneider et al. | 250—49.5 |
| 3,075,078 | 1/1963 | Olden | 250—49.5 |

RALPH G. NILSON, *Primary Examiner.*

W. F. LINDQUIST, *Assistant Examiner.*